United States Patent [19]

Swearingen

[11] Patent Number: 4,722,663
[45] Date of Patent: Feb. 2, 1988

[54] SEAL-OFF MECHANISM FOR ROTATING TURBINE SHAFT

[75] Inventor: Judson S. Swearingen, Malibu, Calif.

[73] Assignee: Rotoflow Corporation, Los Angeles, Calif.

[21] Appl. No.: 825,801

[22] Filed: Feb. 4, 1986

[51] Int. Cl.⁴ .............................................. F01D 25/32
[52] U.S. Cl. ................................. 415/169 R; 415/174; 277/28; 277/173
[58] Field of Search ........... 415/110, 111, 112, 169 R, 415/173 R, 174, 113; 277/3, 27, 28, 83, 173, 174, 175, 176, 177

[56] References Cited

U.S. PATENT DOCUMENTS

| | | | |
|---|---|---|---|
| 2,418,707 | 4/1947 | Groot | 415/173 A |
| 2,895,751 | 7/1959 | Standish | 277/28 |
| 2,910,328 | 10/1959 | Frolick | 415/112 |
| 2,913,989 | 11/1959 | Boardman et al. | 415/112 |
| 2,936,715 | 5/1960 | Southam et al. | 415/174 |
| 3,475,033 | 10/1969 | Voitik | 277/28 |
| 4,193,603 | 3/1980 | Sood | 415/112 |
| 4,428,584 | 1/1984 | Shapiro | 277/3 |
| 4,477,223 | 10/1984 | Giroux | 415/169 R |
| 4,495,035 | 1/1985 | Swearingen | 415/112 |
| 4,587,076 | 5/1986 | Bonhomme | 415/112 |

FOREIGN PATENT DOCUMENTS

| | | | |
|---|---|---|---|
| 2632649 | 2/1977 | Fed. Rep. of Germany | 415/112 |
| 1023343 | 3/1953 | France | 415/173 R |
| 16618 | 7/1969 | Japan | 415/113 |
| 896482 | 5/1962 | United Kingdom | 415/113 |
| 923098 | 4/1963 | United Kingdom | 415/113 |

Primary Examiner—Robert E. Garrett
Assistant Examiner—John T. Kwon
Attorney, Agent, or Firm—Lyon & Lyon

[57] ABSTRACT

A seal-off mechanism for preventing migration of working fluid along a turbine shaft which includes a floating seal ring and a shaft shoulder. The seal ring is spring biased against the shaft shoulder. During turbine operation, a pressurized fluid moves the ring away from the shoulder. The pressurized fluid then flows toward the turbine to contain the working fluid. A chamber collects the pressurized fluid and the working fluid for subsequent separation and reuse.

2 Claims, 1 Drawing Figure

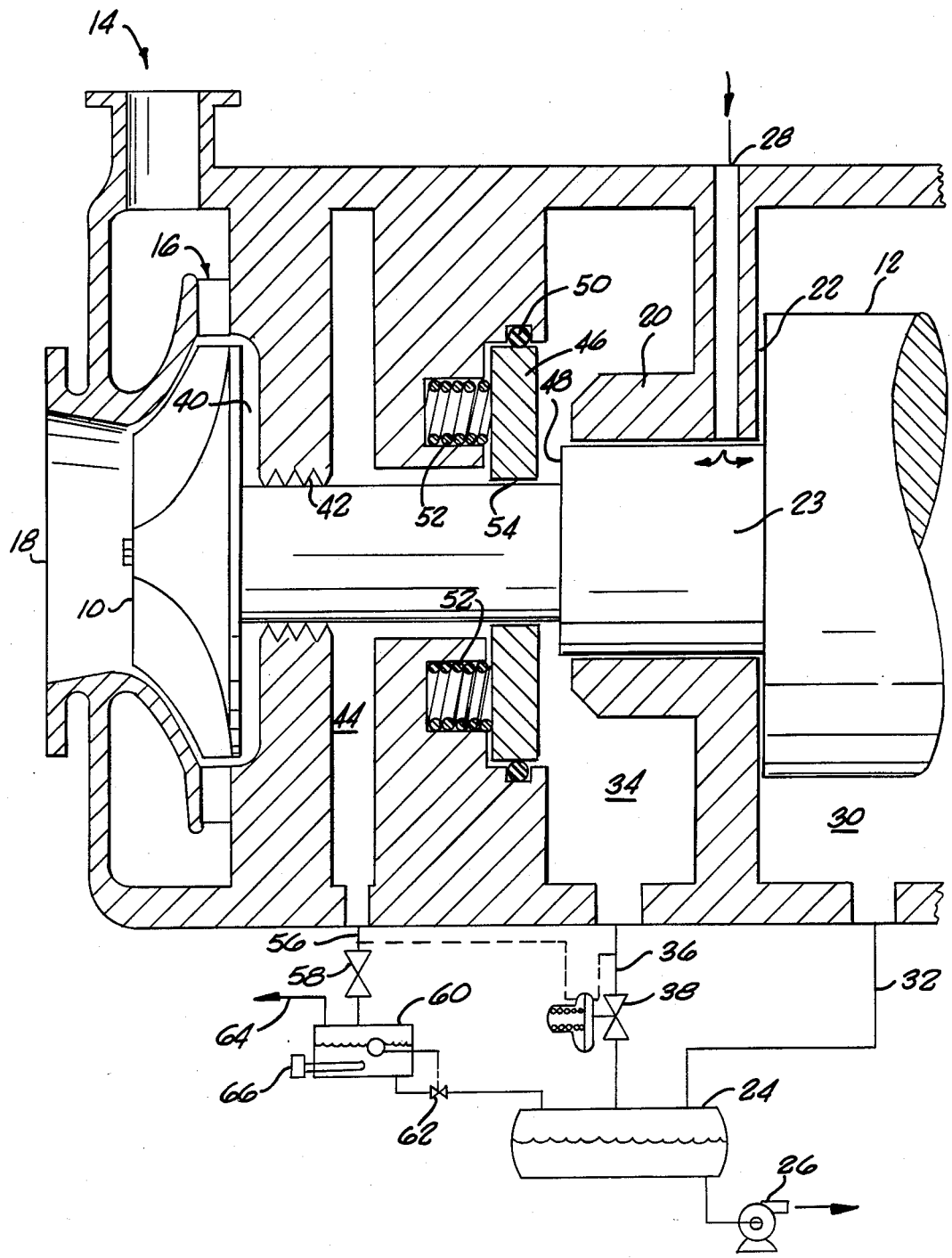

SEAL-OFF MECHANISM FOR ROTATING TURBINE SHAFT

BACKGROUND OF THE INVENTION

The field of the present invention is shaft sealing mechanisms for high-speed rotating machinery.

In high speed turbomachinery pressurized working fluid is introduced to a rotor within a turbine housing. The rotor is mounted to a shaft which is rotatably mounted within one or more bearings normally arranged outwardly of the rotor cavity of the turbine housing. A shaft seal is conventionally provided to avoid flow of the working fluid into the bearings. In high speed equipment a positive mechanical seal is often impractical. Consequently, labyrinth seals are frequently employed to seal the rotor cavity about the turbine shaft. Labyrinth seals employed in such applications tend to allow some flow of working fluid across the seal. This flow increases with a decrease in shaft speed such as experienced during shutdown.

In high speed turbomachinery employing such labyrinth seals, the adjacent bearing frequently is employed to provide the hermetic seal for the small amount of fluid leaking through the labyrinth seal. The working bearing about the turbine shaft can provide such a complete seal when lubricant is continuously provided to the bearing under positive pressure. Lubricant flowing from the bearing along the shaft toward the labyrinth seal often mixes with the working fluid passing through the seal. The fluids can be drawn off and separated for reuse.

In situations where the flow of pressurized lubricant to the bearing most adjacent the labyrinth seal in such turbomachinery is cut off, the pressurized working fluid passing through the labyrinth seal can drive the lubricant from the bearing. Under such circumstances, the hermetic sealing of the system at the bearing is lost. Furthermore, the working fluid is typically not a good lubricant and damage to the bearing can result from the loss of lubricant. Another adverse condition can also arise when there is low working gas pressure. In the area between the labyrinth seal and the bearing, reduced pressure might exist which would permit air or other fluid to leak through the bearing into this area and into the labyrinth seal under conditions when lubricant is not provided under pressure to the bearing.

SUMMARY OF THE INVENTION

The present invention is directed to a seal-off mechanism for a turbine shaft. To this end, a resiliently biased shaft seal ring operates in conjunction with a shaft shoulder to provide a positive seal. During operation, the seal ring may be lifted off the shoulder by lubricant pressure to separate the mechanical seal from the high speed shaft. Should the lubricant pressure drop, a positive mechanical seal is again created.

BRIEF DESCRIPTION OF THE DRAWINGS

A single FIGURE depicts a schematic representation of a seal-off mechanism constructed in accordance with the present invention.

DETAILED DESCRIPTION OF THE PREFERRED EMBODIMENT

Turning to the FIGURE, a turbine rotor 10 is shown mounted on the end of a shaft 12. Pressurized turbine working fluid enters at a connection 14, flows through primary nozzles 16 into the rotor 10, passes radially inwardly through the rotor 10, and discharges at an outlet 18. The shaft 12 is mounted on bearings, the bearing 20 most adjacent the shaft seal being illustrated. The bearing 20 is a combination radial bearing and axial thrust bearing, the thrust base being at 22. At the bearing 20, the shaft 12 includes a journal 23. There is a similar bearing support for the shaft, not shown, which cooperates to constrain the shaft to a fixed axial and radial position.

Lubricant from a reservoir 24 is delivered under pressure by a pump 26 into a connection 28 where it enters bearing 20 and lubricates it. Bearing 20 is a hydrodynamic bearing and comprises lubricant distributing grooves in the bearing face which permit the lubricant to be dispersed throughout the bearing, thereby providing a lubricant cushion for the rotating shaft. The lubricant is pumped into the inlet connection 28 at a high flow rate driven by a high pressure, e.g. 100 psi. Upon introduction to the bearing, the lubricant flows in both directions along the shaft axis until it escapes from the bearing. That which flows away from the turbine lubricates the thrust bearing base 22 and discharges into a chamber 30, where it drains back to the reservoir 24 through a line 32. Lubricant which drains out of the bearing toward the turbine discharges into a chamber 34 and then flows through a line 36 and a valve 38 into the chamber 24.

The working fluid passing through the turbine fills a space 40 which is defined in part by a close-clearance labyrinth seal 42. The seal 42 contains most of the working fluid in the space 40, but, when high pressures are present in the turbine, some of the working fluid leaks past the seal 42 into a chamber 44.

Positioned on the shaft 12 is a floating seal ring 46, which fits closely but freely on the shaft 12 and is axially moveable to seat against a shoulder 48 on the shaft bearing journal 23 to seal off the bearing chamber 34. The outside of the seal ring 46 is sealed by an "O" ring 50. The seal ring 46 is urged against the shaft shoulder 48 by the springs 52. The chamber 34, which is defined in part by the interface between the seal ring 46 and the shaft shoulder 48, is thereby sealed.

During normal operation, while the shaft 12 and the bearing 20 are being lubricated by the lubricant delivered through the line 28, the lubricant escaping from the turbine end of bearing flows into the chamber 34 and escapes through the line 36. The line 36, however, has the back pressure control valve 38, which receives its signal by comparison of the pressure in the chamber 34 with that in chamber 44. The valve 38 is so adjusted that it opens only when the chamber 34 is at a pressure on the order of 25 psi higher than that prevailing in the chamber 44. This pressure difference thus maintained between the chambers 34 and 44 results in a net force on the face of the seal ring 46 which acts to depress the springs 52, thus moving the seal ring 46 off the shaft shoulder seats 48. The pressure differential required to open the seal ring 46 is preferably below that for activating the valve 38 in order that the seal ring will remain open during operations.

Between the seal ring 46 and the shaft 12 is a clearance 54 through which lubricant may flow. The lubricant leaking under the seal ring 46 through the clearance 54 tends to keep the ring 46 cool. However, to provide further protection from overheating due to friction with the shaft, it is preferable to make the ring of aluminum or bronze, which thermally expands more than the shaft to increase the clearance 54 on heating, thus relieving and protecting the inner surface of the ring 46.

The slight amount of lubricant that, subject to the 25 psi pressure difference, leaks through the clearance 54 between the seal ring 46 and the shaft 12 leaks into the chamber 44. Its rate of leakage would typically be on the order of a fraction of a gallon per minute. This lubricant, together with the working fluid that leaks past the seal 42, drains out of the chamber 44, into the line 56, through the valve 58, and into a reservoir 60.

The lubricant can leave the reservoir 60 because the lubricant level therein is controlled by a level control valve 62 which permits the lubricant to flow back into the reservoir 24 for reuse. The vaporized working fluid entering the reservoir 60 cannot pass through the reservoir 60 into the reservoir 24 because only liquid is permitted to exit through the valve 62. There is, however, an exit 64 for disposition of the working fluid (vapor) entering the reservoir 60. It flows through the line 64 and back to the system for reuse. Because the lubricant entering the reservoir 60 from the chamber 44 will contain some working fluid dissolved therein, the reservoir 60 includes a heater 66 and the dissolved working fluid is largely boiled out of the lubricant and disposed of through the line 64.

While the turbine is in operation, the lubricant pressure differential between the chambers 34 and 44 will prevent working fluid from migrating past the seal ring 46. Rather, lubricant will flow through the clearance 54 toward the turbine. In this manner, the working fluid is contained and recovered. Thus, the lubricant also serves as a containing fluid to prevent migration of the working fluid past the seal ring 46. Of course, it will be appreciated that the lubricant need not be used as a containing fluid and that a separate containing fluid could be employed.

Should the turbine encounter an emergency shutdown, the lubricant pump 26 would presumably stop and the lubricant pressure at the inlet 28 will be lost. The lubricant under pressure in the chamber 34 will also leak away under the seal ring 46 through the clearance 54. With the pressure no longer prevailing in the chamber 34, the springs 52 will urge the seal ring 46 against the shaft shoulder 48. This effectively closes the leakage path for the working fluid between the chambers 34 and 44. The only other escape route is through the line 56. This is not objectionable because the working fluid can be passed through the line 64 and back to the system. The fluid can not pass through the valve 62 because the low level in the reservoir 60 will maintain the level control valve 62 closed.

Should operation be restored, the process will reverse itself. Lubricant pressure will be restored by the pump 26 to the line 28 and lubricant will flow out of the bearing clearance into the chamber 34 and quickly build up pressure there. Prior to reaching the 25 psi pressure differential across the seal ring 46, the seal ring 46 will again depress the springs 52 and the clearance between the bearing shoulder 48 and the seal ring 46 will be reestablished.

Another condition under which the seal-off mechanism may function is during the evacuation of the turbine system including the chamber 44. Should the chamber 44 be evacuated, a spring compression force will be felt on the springs 52. However, a differential pressure approaching 25 psi between the chambers 34 and 44 is required to overcome the springs 52 to force the seal ring 46 away from the shaft shoulder seat 48. Thus, the seal 46 will not open under a vacuum, that being limited to 14.7 psi. The seal 46 will remain seated on the shoulder 48 and no leakage will occur from the chamber 34 into the chamber 44.

Thus, a seal-off mechanism for a turbine shaft is disclosed. Should bearing lubricant pressure drop, as during shutdown, a seal and shoulder combination will prevent the escape of the turbine working fluid. During normal operation, the mechanical seal is reteracted from engagement.

While embodiments and applications of this invention have been shown and described, it would be apparent to those of ordinary skill in the art that many more modifications would be possible without departing from the inventive concept herein. Thus, the invention is not to be limited except in the spirit of the appended claims.

What is claimed is:

1. A turbine comprising:
   a turbine housing having a rotor cavity;
   a rotor in said cavity;
   a first bearing fixed in said housing and displaced from said rotor cavity;
   a shaft rotatably mounted in said bearing, said rotor being fixed to said shaft, said shaft having an annular shoulder facing toward said rotor between said first bearing and said rotor;
   a seal cavity between said rotor cavity and said first bearing about said shaft in said housing;
   a bearing cavity in said housing between said first bearing and said seal cavity;
   a seal ring in said housing about said shaft resiliently biased against said shoulder between said bearing cavity and said seal cavity; and
   vent means for venting said bearing cavity to a preselected differential pressure of said bearing cavity over said seal cavity, said vent means including a bearing cavity vent for said bearing cavity, a valve controlling said bearing cavity vent and a valve controller actuated by differential pressure between said bearing cavity and said seal cavity.

2. The turbine of claim 1 further comprising a seal cavity vent.

* * * * *